United States Patent [19]

Forquer

[11] Patent Number: 4,503,899

[45] **Date of Patent: * Mar. 12, 1985**

[54] LOCKING MEANS FOR GEAR DRIVE

[75] Inventor: William F. Forquer, Venice, Fla.

[73] Assignee: Security Shutter Corp., Venice, Fla.

[ * ] Notice: The portion of the term of this patent subsequent to Dec. 27, 2000 has been disclaimed.

[21] Appl. No.: 362,523

[22] Filed: Mar. 29, 1982

Related U.S. Application Data

[63] Continuation-in-part of Ser. No. 331,257, Dec. 16, 1981.

[51] Int. Cl.³ .......................... E06B 9/08; E06B 9/20; F16H 57/10; F16H 1/16

[52] U.S. Cl. .................................... 160/133; 160/309; 74/411.5; 74/425

[58] Field of Search ...................... 74/411.5, 425, 625; 464/39, 38; 160/133, 309

[56] References Cited

U.S. PATENT DOCUMENTS

| | | | |
|---|---|---|---|
| 465,892 | 12/1891 | Smith | 74/625 |
| 1,147,188 | 7/1915 | Rojas | 160/309 |
| 1,344,288 | 6/1920 | Carson | 74/625 |
| 1,557,058 | 10/1925 | Johansen | 160/133 |
| 1,744,686 | 1/1930 | Pease et al. | 160/309 |
| 1,858,624 | 5/1932 | Hess et al. | 74/625 |
| 2,758,345 | 8/1956 | White | 49/77 |
| 2,882,749 | 4/1959 | Painter | 74/625 |
| 3,021,723 | 2/1962 | Happe | 74/411.5 |
| 3,214,992 | 11/1965 | Dietrich | 74/425 |
| 3,490,307 | 1/1970 | Jetter | 74/425 |
| 3,813,958 | 6/1974 | Meyer | 74/425 |
| 4,294,302 | 10/1981 | Ricke, Sr. | 160/309 |
| 4,310,087 | 1/1982 | Gawler | 74/425 |
| 4,422,493 | 12/1983 | Forquer | 160/309 X |

FOREIGN PATENT DOCUMENTS

| | | | |
|---|---|---|---|
| 1509412 | 6/1969 | Fed. Rep. of Germany | 74/411.5 |
| 1011085 | 11/1965 | United Kingdom | 160/319 |
| 251343 | 7/1970 | U.S.S.R. | 74/625 |

*Primary Examiner*—Lawrence J. Staab
*Assistant Examiner*—Michael David Bednarek
*Attorney, Agent, or Firm*—Hauke and Patalidis

[57] ABSTRACT

A locking mechanism for a gear drive such as the gear drive of a roll-type shutter or awning. One of the gear shafts, preferably the driving gear shaft, is rotatably supported such as to be longitudinally displaceable, and carries at its free end a transverse pin. A stationary member is provided with radial grooves engageable by the projecting end of the pin when the shaft is longitudinally displaced under the action of a coil spring. The gear is coupled to the shaft by a pin transversely disposed through the shaft and projecting in longitudinal grooves formed in a portion of the gear. The locking mechanism is unlocked by introducing the end of a crank handle into a coupling socket mounted on the other end of the shaft, and applying longitudinal pressure with the crank handle, such as to disengage the locking mechanism prior to hand-driving the shaft in rotation by way of the crank handle.

1 Claim, 6 Drawing Figures

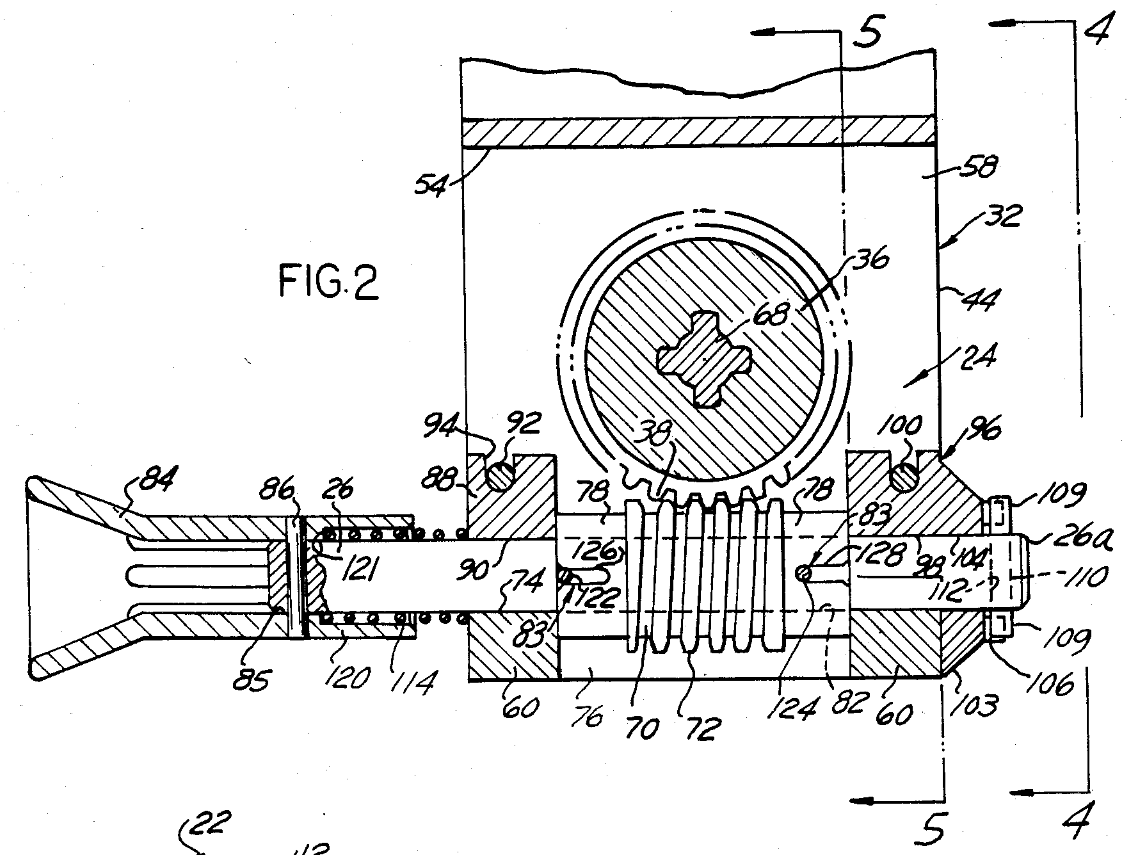
FIG.2
FIG.1
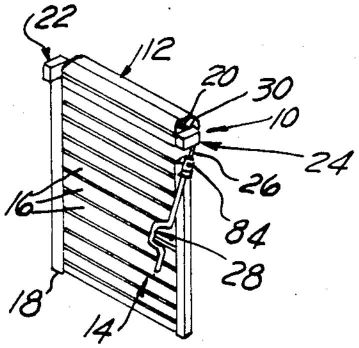
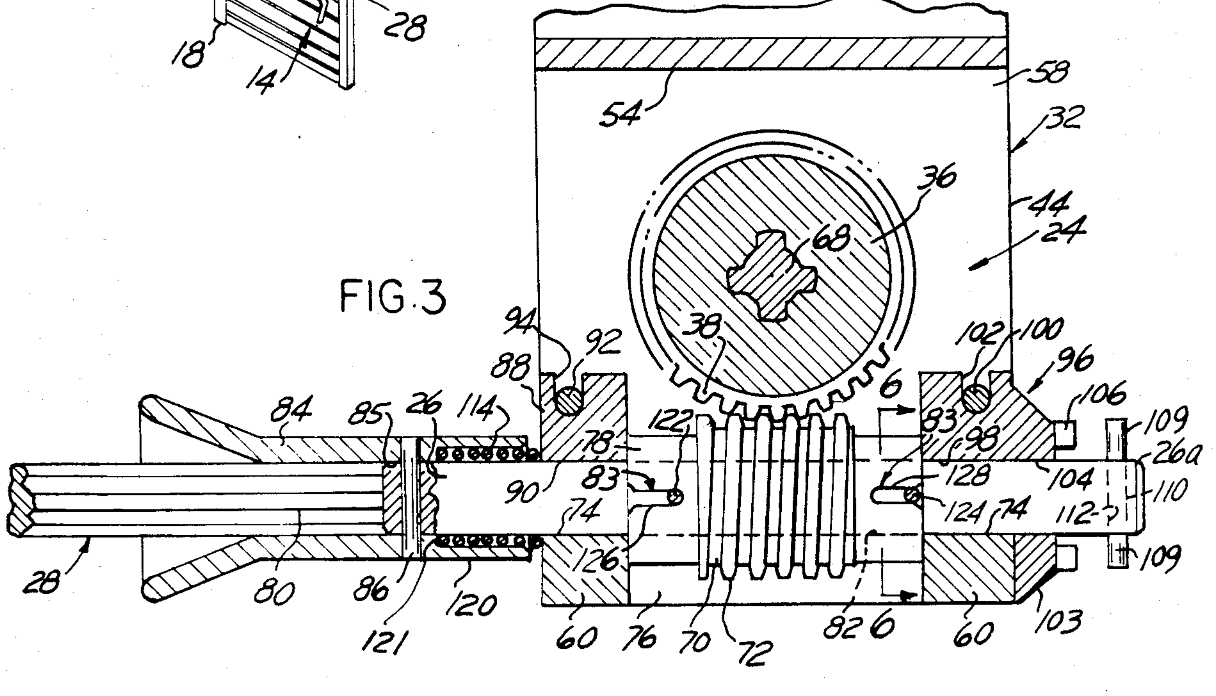
FIG.3

LOCKING MEANS FOR GEAR DRIVE

CROSS-REFERENCE TO RELATED APPLICATION

This application is a continuation-in-part of application Ser. No. 331,257 filed Dec. 16, 1981, for Support Members and Gear Drive for Shutter and Awning Device, and assigned to the same assignee as the present application.

BACKGROUND OF THE INVENTION

The present invention relates to means for locking a gear drive and more particularly, means for locking a gear drive incorporated into a protective roll-type shutter or awning device.

Security type shutters and awnings comprising a plurality of slats made of extruded aluminum, or other material, hingedly interlocked at each edge, and which can be rolled away by winding around a drum or about a rotatable shaft, are generally provided with a gear drive for the drum or rotatable shaft. Such an arrangement is disclosed, for example, in U.S. Pat. No. 4,294,302 assigned to the same assignee as the present application.

Gear drives for the rotatable shaft of a shutter or awning device generally have a driveshaft which is capable of being directly driven in rotation by a hand crank, or by a second shaft in turn hand or power driven through a second gear drive. The gear drive is enclosed in a housing, and the driven shaft and driving shaft are generally coupled by means of a pair of gears having their axes of rotation disposed in planes at right angles to each other. The gears are usually of the bevel type and provide a one-to-one gear ratio, which requires considerable manual effort for cranking heavy shutter assemblies. Moreover, the gear drive is reversible, which requires that some locking means be provided so that the shutter can be maintained in a rolled-up position, or in any intermediate position from completely rolled-up to fully rolled-down.

Means for preventing the reverse rotation of gear drives incorporated in roll-type shutter or awning assemblies are known in the prior art. For example, copending application Ser. No. 331,257 filed Dec. 16, 1981, discloses a worm gear drive which, in addition to presenting the advantage of non-reversibility at high gear ratios and resistance to reversibility at lower gear ratios, is provided with a drag brake arrangement for frictionally inhibiting undesired reverse action of the worm gear drive.

It is apparent, however, that mere frictional resistance may be insufficient to withstand the reverse rotational force applied to a driven shaft by a heavy rolled-up awning, especially in low gear-ratio worm gear drives and in bevel and straight gear drives.

In the above-mentioned U.S. Pat. No. 4,294,302, a positive locking mechanism for a gear drive incorporating bevel gears is disclosed which comprises a compression spring urging two sets of mating teeth into engagement with each other. One set of teeth is formed integrally with a portion of the interior of a gear box housing. The other set of teeth is disposed around the periphery of the driveshaft proximate one end. When both sets of mating teeth are engaged, the driving and driven shafts are held against rotation.

In such a configuration, the teeth on the driving shaft and within the gear box housing are disengaged by a driving handle or crank being pressed into a handle socket affixed at the end of the driving shaft projecting from the gear box. The driving handle longitudinally displaces the driving shaft against the pressure of the spring, thereby disengaging the mating teeth on the shaft from the teeth within the housing. Rotation of the unlocked driving shaft by the driving handle can thereafter be performed for raising or lowering the shutter.

Placement of interlocking teeth on the driveshaft and within the gear drive housing is a satisfactory locking means provided that the shutter user remembers to longitudinally displace the driving shaft against the pressure of the compression spring before attempting to rotate the driving shaft with the handle or crank. However, if the user neglects to press the handle into the socket, thereby failing to displace the driving shaft longitudinally, the locking mechanism can be irreparably damaged, which in turn requires replacement of the entire gear drive as the only means for returning the shutter or awning assembly to an operable condition.

What is needed, therefore, is an improved mechanism for locking the gear drive of a shutter or awning device, which can be manufactured at low cost and which is more positive in its braking action than a mere frictional drag brake. Further, a gear drive locking mechanism is needed which is easier to repair than is the replacement of the entire gear drive when a user neglects to disengage the locking means prior to raising or lowering the shutter or awning.

SUMMARY OF THE INVENTION

The present invention remedies the inconveniences of the prior art by providing novel gear drive locking means for gear drives incorporated in roll-type shutter or awning devices. The locking means of the invention tends to withstand an attempt by a shutter or awning user to operate the gear drive without first disengaging the locking means. Moreover, a damaged locking mechanism can be repaired at low cost by replacing an easily accessible and low cost part.

These and other objects and advantages of the present invention will become apparent to those skilled in the art when the following description of the best mode contemplated for practicing the invention is read in conjunction with the accompanying drawing, wherein like numerals refer to like or equivalent parts, and in which:

BRIEF DESCRIPTION OF THE DRAWING

FIG. 1 is a schematic perspective view of a shutter assembly shown in its lowered position over a window or door;

FIG. 2 is a longitudinal sectional view through a gear drive provided with a locking mechanism according to the present invention;

FIG. 3 is a view similar to FIG. 2 but showing the locking mechanism disengaged.

DETAILED DESCRIPTION OF THE PREFERRED EMBODIMENTS

Figure 4:
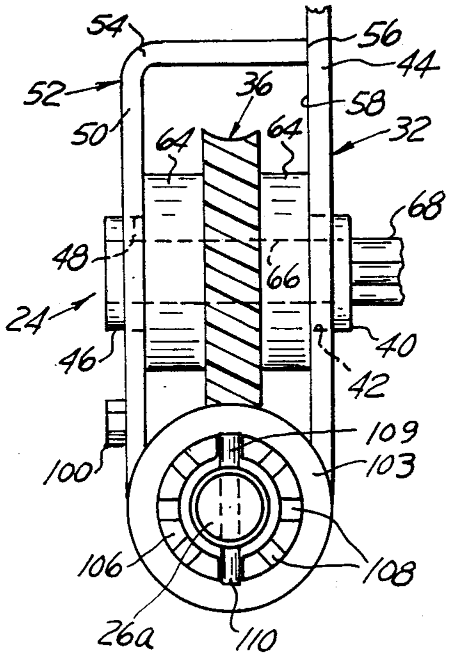
FIG. 4 is a front elevational view thereof from line 4—4 of FIG. 2.
Figure 5:
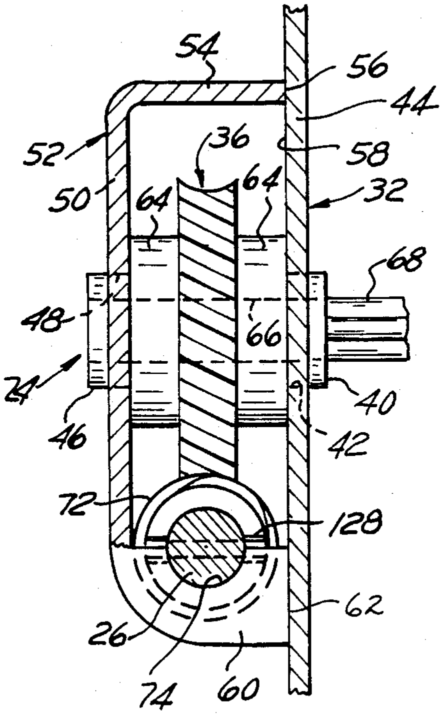
FIG. 5 is a cross-sectional view thereof, along line 5—5 of FIG. 2.

Referring to FIG. 1 of the drawing, a roll-up shutter assembly 10 is shown in its lowered position, covering a window or door, not shown, in a wall 12. The shutter assembly 10, shown for purpose of illustration, but forming no part of the present invention, comprises a curtain 14 made of a plurality of individual elongated slat members 16 attached to each other along their adjoining edges such as to be articulated relative to each other. The curtain 14 of interlocked hinged slats 16 is vertically slidable between parallel lateral guide rails 18 and is capable of being raised from the shown lowered position by being wound about the periphery of a rotatable shaft 20 supported at one end by, for example, a support bracket or member 22 and at its other end by a support and gear drive member 24. A gear drive mechanism disposed in the support and gear drive member 24 drives the rotatable shaft 20 in rotation from an input or driving shaft 26 by means of a hand crank 28, for example. Although the rotatable shaft 20 may support a drum around which the shutter slats 16 are wound or unwound, preferably, as shown, spoke-like brackets 30 affixed to the rotatable shaft 20 and to the end slat of the slat curtain 14, as explained in detail in the aforesaid U.S. patent, permit the curtain 14 of slats 16 to wind and unwind about the rotatable shaft 20, spaced away therefrom, when the rotatable shaft 20 is rotated in one direction or the other.

As best seen at FIGS. 2–5, as one example of structure, a gear drive 24 of the general configuration disclosed in application Ser. No. 331,257 is shown mounted in a gear drive enclosure or housing partially shown at 32. The gear drive 24 comprises a worm wheel 36 peripherally provided with teeth 38 and having a stub shaft 40 on one side journalled through an appropriate bore 42 disposed substantially at the center of a side wall 44 of the gear drive housing 32. The bore 42 may be provided, if so desired, with appropriate bearing means. As shown, the worm wheel 36 has another stub shaft 46 projecting on its other side through an appropriate journal bore 48 disposed through the side wall 50 of a substantially U-shaped saddle member 52. The saddle member 52 has an end portion bent over at a right angle, as shown at 54, having an edge 56 abutting against the internal surface 58 of the side wall 44, and a second end portion or leg 60, also bent over at right angle, having a relatively large area foot portion 62 abutting against the interior surface 58 of the side wall 44, FIG. 5.

The stub shaft 40 of the worm wheel 36 has an enlarged portion 64 defining a spacer, and the stub shaft 46 of the worm wheel 36 also has an enlarged portion 64 defining a spacer, such as to prevent lateral displacement of the worm wheel 36. A bore 66 is axially formed through the stub shafts 40 and 46, spacers 64 and worm wheel 36, which, preferably, are all made as a single piece, or alternatively, made of separate elements integrally joined together. The axial bore 66 accepts and engages with a splined shaft 68 so that when the worm wheel 36 is driven in rotation, the shaft 68 is also driven in rotation.

A worm pinion 70 is tangentially disposed relative to the worm wheel 36. The teeth 38 of the worm wheel 36 mesh with the teeth or scroll 72 of the worm pinion 70 through which the driveshaft 26 is journalled. The leg portion 60 of the saddle 52 is provided with a substantially half-cylindrical recess 74, FIG. 5, which journals the driveshaft 26. The leg portion 60 of the saddle 52 is provided with a cut-out section 76 providing clearance for the periphery of the worm gear 70 and forming thrust bearings for a pair of solid cylindrical portions 78 formed integrally on each side of the worm pinion 70 to prevent longitudinal displacement of the worm pinion 70 when the driveshaft is driven in rotation, for example, from the driving end 80 of the crank 28 introduced through a driving handle socket 84 keyed on the end of the driveshaft 26, FIGS. 2 and 3.

The driveshaft 26 which is slidably disposed within a longitudinal bore 82 through the worm gear 70 and integral worm gear end portions 78, drives the worm gear 70 in rotation as will be hereinafter described in detail, by way of a pair of pin and slot coupling arrangements 83.

The driving handle socket 84 has an open axial longitudinal bore 85 in which is fitted the end of the driveshaft 26. A pin, such as a spring cotter pin 86, for example, is fitted through aligned transverse bores in the socket 84 and the end of the driveshaft 26 so as to secure the driving handle socket 84 to the driveshaft 26.

A plastic or metallic insert 88 provided with a substantially half-cylindrical recess 90 is disposed in engagement with the peripheral surface of the driveshaft 26 and is held by means of a through-bolt 92 engaged through a slot 94 in the insert. One side face of the insert 88 engages the end face of one of the cylindrical portions 78 of the worm pinion 70. The other cylindrical portion 78 of the worm pinion 70 engages the end face of a second insert or nose cap 96 provided with a substantially half-cylindrical recess 98 in abutment with the peripheral surface of the driveshaft 26 and held by means of a through-bolt 100 passed through a slot 102 in the body of the end cap 96. Each bolt 92 or 100 also passes through the housing side wall 44, and the saddle side wall 50, in a manner not shown.

The insert 88 and the insert-nose cap 96, by way of their half-cylindrical recesses 90 and 98 combined with the half-cylindrical recesses 74 in the saddle leg 60, contribute to forming full journal bearings for the driveshaft 26.

The insert-nose cap 96 has a protruding tapered end portion 103 provided with a bore 104 in alignment with the journal bores 82, 98 formed by the half-cylindrical recesses 74 of the saddle 60 and the insert-nose cap 96. The end portion 26*a* of the driveshaft 26 projects through the bore 104. The insert-nose cap 96 is further provided with an annular end face 106 at the edge of its tapered end portion 103.

As best seen at FIG. 4, the exterior surface of the annular face 106 of the insert-nose cap 96 is provided with a plurality of grooves 108 disposed radially in regularly spaced apart angular relationship. As shown, the radial grooves 108 are arranged in diametrically opposed pairs. Each of the grooves 108 has a width sufficient to interlock with the projecting portions 109 of a pin 110. The pin 110 is fitted through a transverse bore 112, for example, disposed proximate the end portion 26*a* of the driveshaft 26. When the locking projecting portions 109 of the pin 110 are engaged within a pair of diametrically opposed grooves 108, the driveshaft 26 is held against rotation, FIG. 2. On the other hand, when the driveshaft 26 is longitudinally displaced to the right, FIG. 3, the locking projecting portions 109 of the pin 110 are disengaged from the grooves 108 and the driveshaft 26 is able to be rotated.

If so desired, the locking pin 110 may be made slightly weaker than the tooth-like projections between the grooves 108 of the insert-nose cap 96, so that if the shutter or awning owner neglects to longitudinally displace the driveshaft 26 prior to rotating the driveshaft, the pin 110 will break first and leave the remainder of the gear drive 24 undamaged. Thereafter, the gear drive locking mechanism may be inexpensively repaired by replacing the pin 110.

The driveshaft 26 is longitudinally displaced to the right by applying pressure on the driving handle 28 such as to cause the face of the handle end 80 to pass against the bottom of the socket 84, and longitudinally displace the shaft 26 against a spring biasing force such as to disengage the shaft 26 against a spring biasing force such as to disengage the ends 109 of the pin 110 from within diametrically disposed aligned grooves 108 in the annular face 106 of the insert-nose cap 96.

In the example of structure illustrated, the biasing force is provided by a compression coil spring 114 fitted around the driveshaft 26 and disposed within an increased inner diameter portion 120 of the open longitudinal bore 85 of the driving handle socket 84, such that an end of the coil spring engages the bottom 121 of the socket enclosed diameter bore portion 120. The other end of the compression spring 114 abuts the lateral end face of the saddle 60 and insert 88.

Figure 6:
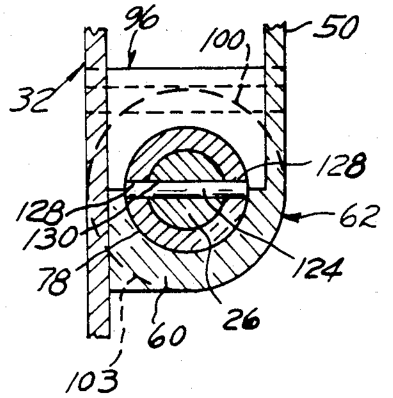
FIG. 6 is a partial cross-sectional view thereof as seen from line 6—6 of FIG. 3.

As shown at FIGS. 2, 3 and 6, the freely rotatable driveshaft 26 drives the worm pinion 70 by means of a pair of pins 122 and 124 each press-fitted through a diametral bore 130 in the driveshaft 26, the projecting ends of the pins being engaged in two pairs of substantially aligned, transverse longitudinal slots in the cylindrical portions 78 of the worm pinion 70, as shown at 126 and 128. When the driveshaft 26 is in the position shown at FIG. 4, the projecting ends of the pins 122 and 124 are relatively disposed at the left end of each of the pairs of slots. However when the driveshaft 26 has been laterally displaced to the position shown at FIG. 5, the respective ends of the pins 122 and 124 slide through the aligned slots to a position relatively at their right end. This arrangement allows the worm pinion 70 to remain in a set position even through the driveshaft 26 is displaced longitudinally through the bore 82 in the worm pinion 70, while at the same time allowing the driveshaft 26 to be coupled to the worm pinion 70 regardless of its longitudinal position.

Having thus described the present invention by way of practical structural examples thereof, modifications whereof will be apparent to those skilled in the art, what is claimed as new is as follows:

1. In a protective shutter assembly for an opening in a wall or the like comprising an articulated curtain of a plurality of interlocked elongated rigid slats assembled hingedly relative to each other, a drive mechanism for raising and lowering said articulated curtain, said drive mechanism comprising a shaft having an axis of rotation disposed substantially parallel to the longitudinal axis of said slats, and support members for rotatably supporting said shaft at each end for winding said curtain about said shaft, one of said support members being an open-ended enclosure having a pair of substantially parallel long sidewalls interconnected by a pair of substantially narrow sidewalls, means for supporting said enclosure from a wall with said relatively long sidewalls substantially perpendicular to the axis of said shaft, bearing means mounted on an end of said shaft and rotatably supported in a first aperture through one of said long sidewalls, a U-shaped saddle member having a second aperture providing a journal for a portion of said bearing means, a worm wheel mounted and coupled to said shaft within said U-shaped saddle member, a worm gear tangentially meshing with said worm wheel, a driveshaft supporting said worm gear means coupling said driveshaft to said worm gear, bearing means for rotatably supporting said drive-shaft, fastening means for attaching said U-shaped saddle to the inside surface of said long sidewall with said apertures substantially aligned, and locking means for said drive mechanism, said locking mechanism comprising a first locking member mounted at an end of said driveshaft, a second locking member disposed stationary on close proximity with said first locking member, and biasing means longitudinally urging said driveshaft in a direction inter-engaging said first and second locking members in interlocked relationship, wherein said means coupling said driveshaft to said worm gear comprises a first transverse pin disposed through said driveshaft and having at least one end projecting from said driveshaft, a longitudinal slot in a portion of said worm gear, said projecting end of said pin being slidably engaged in said longitudinal slot, and means preventing said driving gear from being displaced when said driveshaft is longitudinally displaced, wherein said first locking member comprises a second transverse pin disposed through said driveshaft at one end thereof and said second locking member comprises a stationary member surrounding said driveshaft at said one end thereof, and at least a pair of diametrically disposed radial grooves on an end face of said member, said pin having diametrically projecting ends for engagement with said grooves, and wherein said biasing means is a compressed coil spring disposed around said driveshaft, said compressed coil spring being disposed between said bearing means supporting said driveshaft and a socket member mounted at the other end of said driveshaft, said socket member having means for coupling with the end of a hand crank adapted to drive said driveshaft in rotation and to longitudinally displace said driveshaft for disengaging said locking members.

* * * * *

UNITED STATES PATENT AND TRADEMARK OFFICE

CERTIFICATE OF CORRECTION

PATENT NO. : 4,503,899

DATED : March 12, 1985

INVENTOR(S) : William F. Forquer

It is certified that error appears in the above-identified patent and that said Letters Patent are hereby corrected as shown below:

Column 4, line 47, change "saddle" to --leg--.

Column 5, lines 15-16, cancel "the shaft 26 against a spring biasing force such as to disengage".

Column 5, line 27, change "60" to --52--.

Signed and Sealed this

*Twenty-fifth* Day of *June 1985*

[SEAL]

*Attest:*

DONALD J. QUIGG

*Attesting Officer* *Acting Commissioner of Patents and Trademarks*